(12) United States Patent
Cha et al.

(10) Patent No.: US 11,567,631 B2
(45) Date of Patent: Jan. 31, 2023

(54) METHOD OF RECOMMENDING EMOTICONS AND USER TERMINAL PROVIDING EMOTICON RECOMMENDATION

(71) Applicant: KAKAO CORP., Jeju-si (KR)

(72) Inventors: Su Hyeok Cha, Seongnam-si (KR); Hui Hyeon Kim, Seongnam-si (KR)

(*) Notice: Subject to any disclaimer, the term of this patent is extended or adjusted under 35 U.S.C. 154(b) by 0 days.

(21) Appl. No.: 17/844,328

(22) Filed: Jun. 20, 2022

(65) Prior Publication Data

US 2022/0404952 A1 Dec. 22, 2022

(30) Foreign Application Priority Data

Jun. 21, 2021 (KR) .......................... 10-2021-0080449

(51) Int. Cl.
*G06F 3/04817* (2022.01)
*G06F 16/14* (2019.01)

(52) U.S. Cl.
CPC ........ *G06F 3/04817* (2013.01); *G06F 16/148* (2019.01); *G06F 2203/04803* (2013.01)

(58) Field of Classification Search
CPC ....... G06F 3/04817; G06F 2203/04803; G06F 16/148
See application file for complete search history.

(56) References Cited

U.S. PATENT DOCUMENTS

| | | | | |
|---|---|---|---|---|
| 2016/0179967 A1* | 6/2016 | Sa | ........................ | G06F 16/3346 707/730 |
| 2016/0210116 A1* | 7/2016 | Kim | ...................... | G06F 40/274 |
| 2017/0308290 A1* | 10/2017 | Patel | ................... | G06F 3/04817 |
| 2017/0344224 A1* | 11/2017 | Kay | ........................ | G06F 3/0482 |
| 2018/0039406 A1* | 2/2018 | Kong | ....................... | G06F 9/451 |
| 2019/0079644 A1* | 3/2019 | Kim | ....................... | G06F 3/0484 |
| 2020/0034033 A1* | 1/2020 | Chaudhri | .............. | H04L 51/063 |
| 2020/0393915 A1* | 12/2020 | Brendel | ........... | G06V 30/19107 |

FOREIGN PATENT DOCUMENTS

KR 10-2018-0029645 A 3/2018

* cited by examiner

*Primary Examiner* — Mong-Shune Chung
(74) *Attorney, Agent, or Firm* — Novick, Kim & Lee PLLC; Jae Youn Kim

(57) ABSTRACT

Provided is a method for recommending emoticons, the method including: displaying, by a user terminal, a first emoticon related to first meta information; and displaying, by the user terminal, first and second recommendation groups, the first and second recommendation groups each comprising at least one recommended emoticon corresponding to the first emoticon, wherein at least one recommended emoticon included in the first recommendation group is related to at least one piece of first associated meta information corresponding to the first meta information, wherein at least one recommended emoticon included in the second recommendation group is related to at least one piece of second associated meta information that corresponds to the first meta information and is different from the first associated meta information, and wherein the first meta information and the first and second associated meta information are different.

19 Claims, 13 Drawing Sheets

| FIELD | IM101 | | | IM104 | IM105 |
|---|---|---|---|---|---|
| | Okay♡ | Nooo.. | I'm now under a difficulty | Go for Chinese food? | Tonkatsu? |
| KEYWORD | Okay/Yes | NO/Nope | Difficult | Chinese food | Tonkatsu/Pork Cutlet |
| BROADER CONCEPT OF KEYWORD | Answer | Answer | - | Menu | Menu |
| TYPE | Positive | Negative | Negative | - | - |
| EMOTION | - | Sadness | Perplexed | - | - |
| CHARACTER | Toshimee | Toshimee | - | Mr. Gyeokpo | - |
| CASUAL LEVEL | B | B | C | A | A |
| PREFERENCE BY AGE GROUP | 30's | 40's | 50's | 30's | 20's |
| PREFERENCE BY GENDER | Female | Female | Male/Female | Male | Male |

FIG. 2

| FIRST EMOTICON | RECOMMENDED EMOTICONS | | |
|---|---|---|---|
| KEYWORD | KEYWORD | TYPE | EMOTION |
| Let's eat | Okay/Yes | Positive | - |
| | No/Busy | Negative | Perplexed |
| | What should I eat?/ Tonkatsu/Chinese food | - | - |
| Tired | Pat Pat | - | Comfort |
| | Cheer up | - | Encouragement |

FIRST META INFORMATION → Let's eat

FIRST ASSOCIATED META INFORMATION → (Positive / -)
SECOND ASSOCIATED META INFORMATION → (Negative / Perplexed)
THIRD ASSOCIATED META INFORMATION → (- / -)

FIG. 6

METHOD OF RECOMMENDING EMOTICONS AND USER TERMINAL PROVIDING EMOTICON RECOMMENDATION

CROSS-REFERENCE TO RELATED PATENT APPLICATIONS

This application claims the benefit of Korean Patent Application No. 10-2021-0080449, filed in the Korean Intellectual Property Office on Jun. 21, 2021, the entire contents of which is incorporated herein by reference.

BACKGROUND OF THE DISCLOSURE

Field of the Disclosure

The present disclosure relates to a method for recommending emoticons and a user terminal providing an emoticon recommendation and more particularly, to a method for a user terminal to recommend an emoticon corresponding to an emoticon received through an instant message service, and a user terminal providing the method.

Related Art

Due to the improvement of wireless communication technologies and the widespread of smart phones, information transmitted and received in instant message services is expanding from text information to various types of multimedia information. In the multimedia information, emoticons are more and more used because they can easily show a user's emotion in fun ways.

Whereas the past instant message services provide a limited number of emoticons capable of expressing some typical emotions, an instant message service for providing more than tens of thousands of emoticons related to various types of emotion and topics has been introduced recently. Therefore, emoticons are being used to express not just a user's emotion in fun ways but also the user's individual personality.

As the number of emoticons provided increases, a function of recommending or curating an appropriate emoticon suitable for a context or situation for a user is becoming more important. To this end, a recent instant message service provides a function to assign keywords to emoticons and search for an emoticon using a keyword input by a user. However, it is inconvenient for the user to search for emoticons by typing a keyword every time and to find a preferred emoticon among the search results.

Therefore, there is an increasing demand for a method for recommending an appropriate emoticon suitable for the user's conversation context or situation in a simpler and faster way.

RELATED DOCUMENT

Patent Document

Korea Patent Application Publication No. 10-2018-0029645 (Published on Mar. 21, 2018)

SUMMARY OF THE DISCLOSURE

An objective of the present disclosure is to provide a plurality of recommendation groups of recommended emoticons associated with an emoticon received by a user terminal, thereby allowing a user to select a preferred emoticon conveniently.

Another objective of the present disclosure is to provide appropriate recommended emoticons based on a context or situation of conversation in response to an emoticon received by a user terminal.

In one aspect, there is provided a method for recommending emoticons, the method including: displaying, by a user terminal, a first emoticon related to first meta information; and displaying, by the user terminal, first and second recommendation groups, the first and second recommendation groups each comprising at least one recommended emoticon corresponding to the first emoticon, wherein at least one recommended emoticon included in the first recommendation group is related to at least one piece of first associated meta information corresponding to the first meta information, wherein at least one recommended emoticon included in the second recommendation group is related to at least one piece of second associated meta information that corresponds to the first meta information and is different from the first associated meta information, and wherein the first meta information and the first and second associated meta information are different.

The method may further include receiving, at the user terminal, a user's interaction with respect to the first emoticon, and the displaying of the first and second recommendation groups may be performed in response to the interaction.

The method may, prior to the displaying of the first and second recommendation groups, further include reading, by the user terminal, the first and second associated meta information that correspond to the first meta information.

The user terminal may include a database in which meta information of a received emoticon and a plurality of pieces of associated meta information corresponding to the meta information are stored, and in the reading, the user terminal may input the first meta information into the database to read the first and second associated meta information.

The method may further include: transmitting, by the user terminal, the first and second associated meta information to a server; and receiving, by the user terminal, a plurality of recommended emoticons related to the first and second associated meta information from the server, and the displaying of the first and second recommendation groups may include classifying and displaying the plurality of recommended emoticons, which are received in the receiving, into the first and second recommendation groups.

The method may, prior to the displaying of the first and second recommendation groups, further include: transmitting, by the user terminal, the first meta information to a server; and receiving the first and second associated meta information from the server.

The method may, prior to the displaying of the first and second recommendation groups, further include: transmitting, by the user terminal, information on the first emoticon to a server; and receiving, by the user terminal, the recommended emoticon from the server.

Meta information related to each of the first emoticon and the recommended emoticon may include a plurality of pieces of meta information classified into a plurality of fields, and the first meta information and the first associated meta information may be meta information corresponding to a same field.

The meta information related each of the recommended emoticons may include a plurality of pieces of meta information divided into a plurality of fields, and the first and second associated meta information may be meta information corresponding to a same field.

The first associated meta information may include a plurality of pieces of different meta information.

The first meta information and the first and second associated meta information may be keywords used to search for a related emoticon.

At least one recommended emoticon included in the first recommendation group may be arranged and displayed according to a predetermined criterion.

The predetermined method may be a method of sorting according to at least one of the user's characteristic information, the user's emoticon usage history, and classification information of a chat room in which the first and second recommendation groups are displayed.

In the displaying the first emoticon, the first emoticon may be displayed in a first area of a screen of a chat room, and in the displaying of the first and second recommendation groups, the first and second recommendation groups may be displayed in a second area different from the first area of the screen.

The first area may be an area in which a dialog between the user and a chat counterpart of the user is displayed, and the second area may be an area in which a keyboard interface for inputting a chat message is displayed whereas the first and second recommendation groups are displayed in the displaying the first and second recommendation groups.

In another aspect, there is provided a user terminal providing emoticon recommendations, the user terminal including: a memory; a processor connected to the memory and configured to execute instructions stored in the memory; an input part configured to receive information under control of the processor; an output part configured to output information under control of the processor; and a communication part configured to transmit information to an outside under control of the processor, wherein the processor is further configured to: display a first emoticon related to the first meta information through the output part; and display first and second recommendation groups through the output part, the first and second recommendation groups each comprising at least one recommended emoticon corresponding to the first emoticon, wherein at least one recommended emoticon included in the first recommendation group is related to at least one piece of first associated meta information corresponding to the first meta information; wherein at least one recommended emoticon included in the second recommendation group is related to at least one piece of second associated meta information that is corresponds to the first meta information and is different from the first associated meta information, and wherein the first meta information and the first and second associated meta information are different.

In another aspect, there is provided a method for recommending emoticons, the method including; providing, by a server, a first emoticon related to first meta information to a user terminal; providing, by the server, a plurality of recommended emoticons corresponding to the first emoticon to the user terminal, the plurality of recommended emoticons being included in any one of first and second recommendation groups; and receiving, by the server, information on any one emoticon selected from among the plurality of recommended emoticons from the user terminal; and providing, by the server, the selected recommended emoticon to a counterpart terminal that is a chat counterpart of the user terminal, wherein at least one recommended emoticon included in the first recommendation group is related to at least one piece of first associated meta information corresponding to the first meta information, wherein at least one recommended emoticon included in the second recommendation group is related to at least one piece of second associated meta information that corresponds to the first meta information and is different from the first associated meta information, and wherein the first meta information and the first and second associated meta information are different.

The method may, prior to the providing the plurality of recommended emoticons, further include: receiving, by the server, the first and second associated meta information from the user terminal; and selecting, by the server, the plurality of recommended emoticons related to the first and second associated meta information.

The method may, prior to the providing the plurality of recommended emoticons, further include: reading, by the server, the first and second associated meta information corresponding to the first meta information; and selecting, by the server, the plurality of recommended emoticons related to the first and second associated meta information.

In the method for recommending emoticons according to the present disclosure, it is possible to provide a plurality of recommendation groups of recommended emoticons associated with an emoticon received by a user terminal, thereby allowing a user to select a preferred emoticon conveniently.

In addition, in the method for recommending emoticons according to the present disclosure, it is possible to provide appropriate recommended emoticons based on a context or situation of conversation in response to an emoticon received by a user terminal.

BRIEF DESCRIPTION OF THE DRAWINGS

FIG. 2 is a summary of emoticons and related meta information according to an embodiment of the present disclosure.

FIG. 6 is a table illustrating another example of first meta information and associated meta information corresponding to the first meta information.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In the present disclosure, that which is well-known to one of ordinary skill in the relevant art has generally been omitted for the sake of brevity.

While terms including ordinal numbers, such as "first" and "second," etc., may be used to describe various components, such components are not limited by the above terms. The above terms are used only to distinguish one component from another.

As used herein, the singular forms are intended to include the plural forms as well, unless the context clearly indicates otherwise.

In the present application, the steps described may be performed regardless of the listed order, except for a case where they must be performed in the listed order due to a special causal relationship.

It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Hereinafter, the present disclosure will be described with reference to the accompanying drawings.

Figure 1:
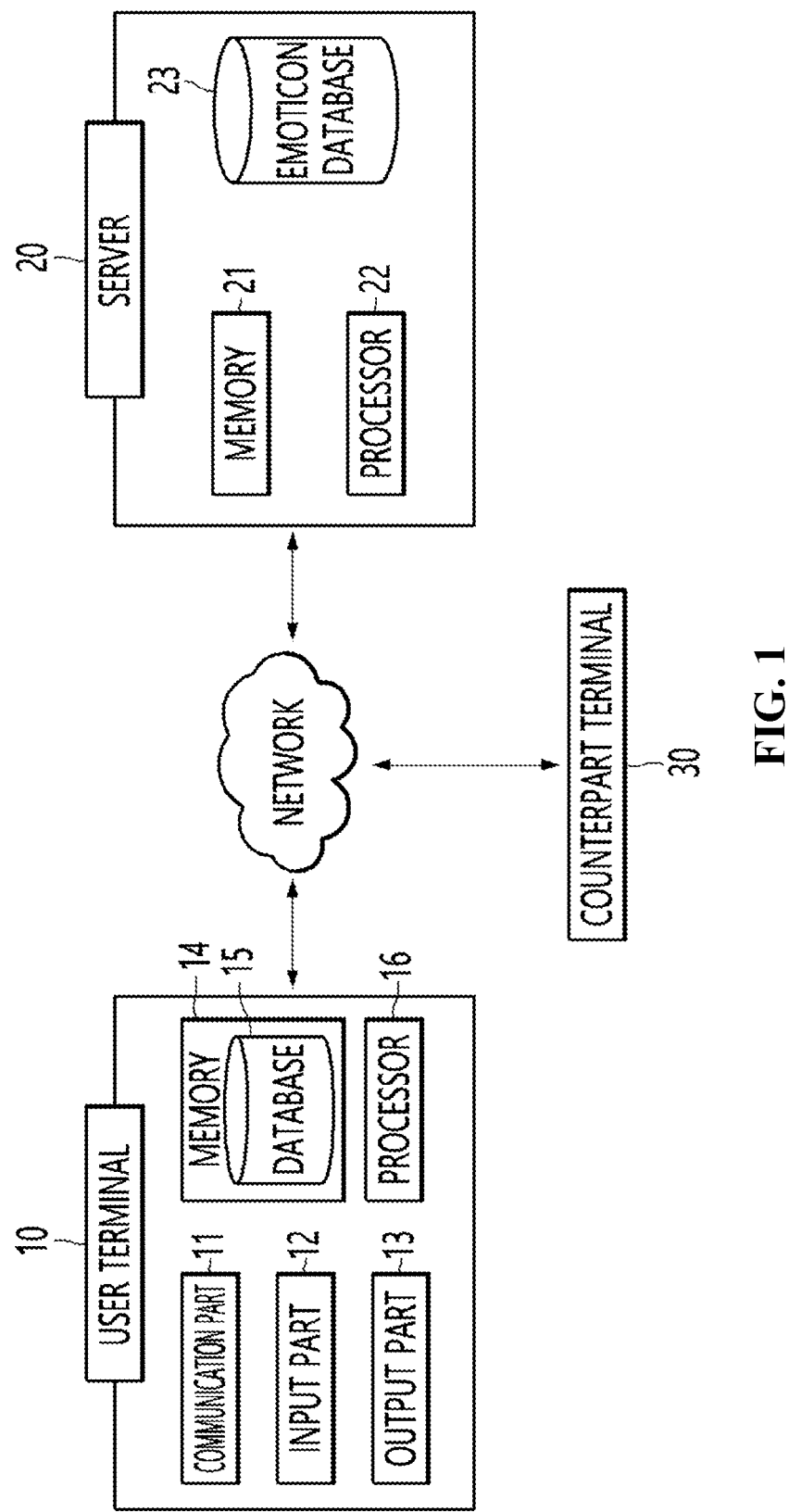
FIG. 1 is a diagram illustrating an example of a network environment according to an embodiment of the present disclosure.

FIG. 1 is a diagram illustrating an example of a network environment according to an embodiment of the present disclosure.

The network environment according to an embodiment of the present disclosure shown in FIG. 1 may include a user terminal 10, a server 20, and a counterpart terminal 30.

A communication method is not limited in a network, and not only a communication method using a communication network (e.g., a mobile communication network, a wired Internet, a wireless Internet, a broadcasting network) that the network could include, but also short-range wireless communication may be included.

The user terminal 10 may be a fixed terminal implemented as a computer device or a mobile terminal. For example, the user terminal 10 may include a smart phone, a mobile phone, a tablet PC, a computer, a notebook computer, a personal digital assistant (PDA), and the like. For example, the user terminal 10 may communicate with the server 20 via a network using a wireless or wired communication method.

The user terminal 10 may be used by a user. The user may be a user of the user terminal 10 or may refer to an account registered as a user in an instant message service provided by the server 20. Accordingly, the fact that the server 20 transmits certain information to a user may mean that the information is transmitted to the user terminal 10 through the user's account registered in the server 20.

The user terminal 10 may include a communication part 11, an input part 12, an output part 13, a memory 14, and a processor 15.

The communication part 11 may communicate with the server 20 or another terminal 30 in a wired/wireless manner.

The input part 12 may receive various types of information according to the user's manipulation and input action. The input part 12 may be a touch screen module, a keyboard, a mouse, a button, a camera, a stylus, a microphone, and the like.

The user terminal 10 may receive the user's interaction through the input part 12. The Interaction means that the user manipulates the input part 12 to input information reflecting the user's selection or intention into the user terminal 10.

The output part 13 may output various types of information. The output part 13 may be a display device, a speaker, a vibration generating device, a tactile sense generating device, or the like. In some cases, the output part 13 may be a device (e.g., Bluetooth earphone) connected to the user terminal through wired/wireless communication (e.g., short-range wireless communication such as Bluetooth) to receive and output a signal.

The memory 14 functions as a storage medium and may store a plurality of application programs driven in the user terminal 10, and data and instructions for operation of the user terminal 10. In terms of hardware, the memory 14 may be provided in the form of any of various storage devices such as ROM, RAM, flash drive, hard drive, or the like, or may be provided in the form of web storage.

In an embodiment, an application related to an instant message service and an application related to a method for recommending emoticons may be stored in the memory 14. In addition, emoticon information may be stored in the memory 14. The emoticon information may include image information on an emoticon, graphic information on the emoticon, and meta information related to the emoticon. In addition, the memory 14 may include a database 15 in which a plurality pieces of meta information items is associated with each other. This database 15 will be described in more detail later.

The processor 16 may control overall operations of the communication part 11, the input part 12, the output part 13, and the memory 14 to execute an application related to an instant message service and an application related to a method for recommending emoticons.

The server 20 may be implemented as a computer device or a plurality of computer devices that communicates with the user terminal 10 via a network to provide commands, codes, files, contents, services, and the like.

The server 20 may include an emoticon database 23 or may be connected to the emoticon database 23 via a network. The emoticon database 23 may include emoticon information that can be downloaded to the user terminal 10. The emoticon information may include image information on an emoticon, graphic information on the emoticon, and meta information related to the emoticon. Here, the emoticon information may be stored in at least one of the memory 14 of the user terminal 10 and the emoticon database 23 of the server 20.

The counterpart terminal 30 is similar to the user terminal 10 described above. Therefore, among characteristics of the counterpart terminal 30, differences thereof from the user terminal will be mainly described.

The counterpart terminal 30 may be used by another user registered for an instant message service provided by the server 20. Here, the another user may be a different subject to be distinguished from the user of the user terminal 10. The another user may be a conversation partner of the user who is participating in the same chat room with the user and sends and receives messages.

The user terminal 10 and the counterpart terminal 30 may transmit and receive information to each other through an instant message service. In some cases, the user terminal 10 and the counterpart terminal 30 may transmit and receive information to and from each other via a directly connected network.

The user terminal 10 of the present disclosure may receive a first emoticon from the server 20 or the counterpart terminal 30 through the communication part 11. The received first emoticon may be related to the first meta information. The user terminal 10 may provide a plurality of recommended emoticons associated with the first emoticon to the user based on the first meta information. The plurality of recommended emoticons may be divided into at least two recommendation groups and displayed on the output part 13 of the user terminal. Here, a recommendation group means a bundle of multiple recommended emoticons related to common meta information, subject, and attribute.

Specifically, a plurality pieces of associated meta information is preset to be associated with the first meta information. Here, the associated meta information refers to meta information related to a recommended emoticon to respond a first emoticon related to the first meta information when the user terminal receives the first meta information.

For example, when the user terminal receives the first emoticon related to the keyword "Let's eat", the user may respond using an emoticon related to the keyword "Okay", "No", "What should I eat?", or the like in normal cases. In this case, "Let's eat" is the first meta information, and "Okay", "No" and "what should I eat?" are associated meta information.

The user terminal may provide a plurality of recommended emoticons to the user based on a plurality of pieces of associated meta information items. The user terminal classifies the plurality of recommended emoticons into a plurality of recommendation groups based on the associated meta information and provides the classified recommended emoticons to the user.

Accordingly, each recommendation group includes at least one recommended emoticon. At least one recommended emoticon included in a recommendation group is related to predetermined associated meta information.

According to such a method for recommending emoticons by the user terminal, the user may be provided with a plurality of recommended emoticons that can be used as a response to the received first emoticon. The user may select an appropriate emoticon from among the plurality of recommended emoticons classified into the plurality of recommendation groups as described above and transmit the selected emoticon to a chat counterpart simply and conveniently.

Prior to describing the method for recommending emoticons according to the present disclosure, emoticons and meta information will be described.

FIG. 2 is a summary of emoticons and related meta information according to an embodiment of the present disclosure.

One emoticon may have meta information related thereto. Here, the meta information of the emoticon refers to information on attributes of the corresponding emoticon. One emoticon may have a plurality of pieces of meta information items. The plurality of meta information items may be divided into a plurality of fields.

As shown in FIG. 2, the plurality of fields may include keyword, broader concept of keyword, type, emotion, character, casual level, preference by age group, preference by gender, and the like.

For example, the keyword field in the fields of meta information may be information for which a user searches to use a corresponding emoticon. For example, as shown in FIG. 2, a Chinese food emoticon IM104 may be an emoticon provided when the user searches for the keyword "Chinese Food".

In some cases, one emoticon may have two or more pieces of keyword meta information. For example, as shown in FIG. 2, an Okay emoticon IM101 may be an emoticon provided when the keyword "Yes" or the keyword "OK" is searched for.

In addition, the broader concept of keyword field in the fields of meta information may be information on a broader concept to which each keyword belongs. For example, as shown in FIG. 2, both the Chinese food emoticon IM104 and a Tonkatsu emoticon IM105 may have the same broader concept of the keyword "Menu" as meta information. This is because the keyword meta information "Chinese food" and "Tonkatsu/Port cutlet" belong to the broader concept of "Menu".

Here, only the broader concept of keyword has been described as an example, but in some cases, there may be a broader concept for another field of meta information. For example, there may be a broader concept of EMOTION field or a broader concept of CHARACTER.

In addition, the type field in the fields of meta information may be information obtained by classifying the contents of an emoticon as one of several representative types. In addition, the emotion field in the fields of meta information may be information on emotion that an emoticon represents. In addition, CHARACTER in the field of meta information may be information on a specific character when the emoticon includes the specific character. In addition, the casual level field in the fields of meta information may be information regarding whether an environment or context where an emoticon is used is appropriate to be casual/light, formal/strict, or the like. In addition, in the field of the meta information, there may be fields indicating which user prefers to a corresponding emoticon, such as preference by age group and preference by gender.

The above-described plurality of fields are merely exemplary, and various fields other than the above-described fields may be added as meta information.

Such meta information may be provided to the user terminal 10 together with an emoticon. Also, in some cases, the meta information may be received by the user terminal 10 from the server 20, separately from the emoticon. Also, in some cases, the meta information may be pre-stored in the user terminal 10. Also, in some cases, the meta information may be stored only in the server 20 but not provided to the user terminal 10.

The method for recommending emoticons according to the present disclosure provides a recommended emoticon by using meta information of the emoticon. This will be described in more detail below.

Hereinafter, an example of a method in which the user terminal 10 according to the present disclosure recommends emoticons will be described with reference to FIGS. 3 to 5.

Figures 3, 4:
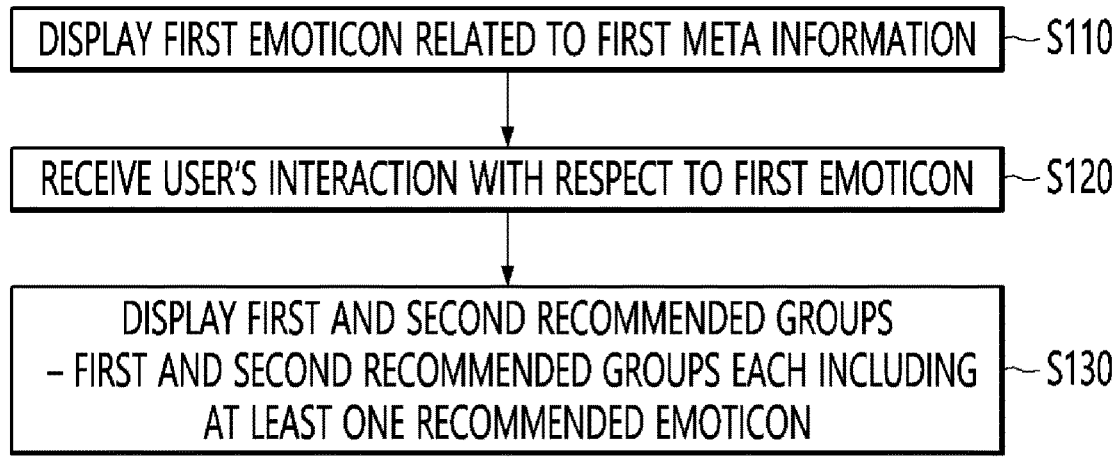
FIG. 3 is a flowchart of a method for recommending emoticons according to an embodiment.
FIG. 4 is a table showing examples of first meta information and associated meta information corresponding to the first meta information.

FIG. 3 is a flowchart of a method for recommending emoticons according to an embodiment.

In operation S110, a user terminal 10 displays a first emoticon through an output part 13. The first emoticon may be transmitted by a counterpart terminal that is a terminal of the user's chat counterpart. The user terminal 10 may receive the first emoticon through a server 20 or a network directly connected to the counterpart terminal.

The first emoticon may be related to first meta information. In some cases, the first emoticon may have a plurality of pieces of of meta information items, and the first meta information may be any one of the plurality of pieces of meta information items.

A plurality of pieces of associated meta information may be preset to be associated with the first meta information. Here, it is assumed that the first meta information is associated with first associated meta information and second associated meta information. The user terminal 10 displays recommended emoticons based on the first and second associated meta information in operation S130 which will be described later.

In operation S120, the user terminal 10 receives the user's interaction with respect to the first emoticon. The interaction may be the user's selecting a portion of the first emoticon displayed on the output part through the input part of the user terminal 10. Specifically, the interaction may be a result of the user's manipulation of a touch screen module, a keyboard, a mouse, a button, a stylus, or the like.

In operation S130, the user terminal 10 displays first and second recommendation groups through the output part 13. In some cases, an additional recommendation group may be displayed in addition to the first and second recommendation groups.

Each recommendation group includes at least one recommendation group corresponding to the first emoticon. At least one recommended emoticon included in a recommendation group is related to preset associated meta information.

Specifically, at least one recommended emoticon included in the first recommendation group is related to the first associated meta information. In addition, at least one recommended emoticon included in the second recommendation group is related to the second associated meta information. The first associated meta information and the second associated meta information each may include at least one piece of meta information. In addition, it is preferable that the first associated meta information and the second associated meta information are different from each other.

FIG. 4 is a table showing examples of first meta information and associated meta information corresponding to the first meta information.

Referring to FIG. 4, when first meta information is "Let's eat" in the keyword field, it indicates that there are three associated meta information items. Specifically, the first associated meta information may be meta information of the keyword field "Yes", the second associated meta information may be meta information of the keyword field "No", and the third associated meta information may be meta information of the keyword field "what should I eat?".

Also, when the first meta information is "Tired" in the keyword field, it indicates that there are two associated meta information items. In detail, the first associated meta information may be meta information of the keyword field "Pat Pat", and the second associated meta information may be meta information of the keyword field "Cheer up".

Figure 5:
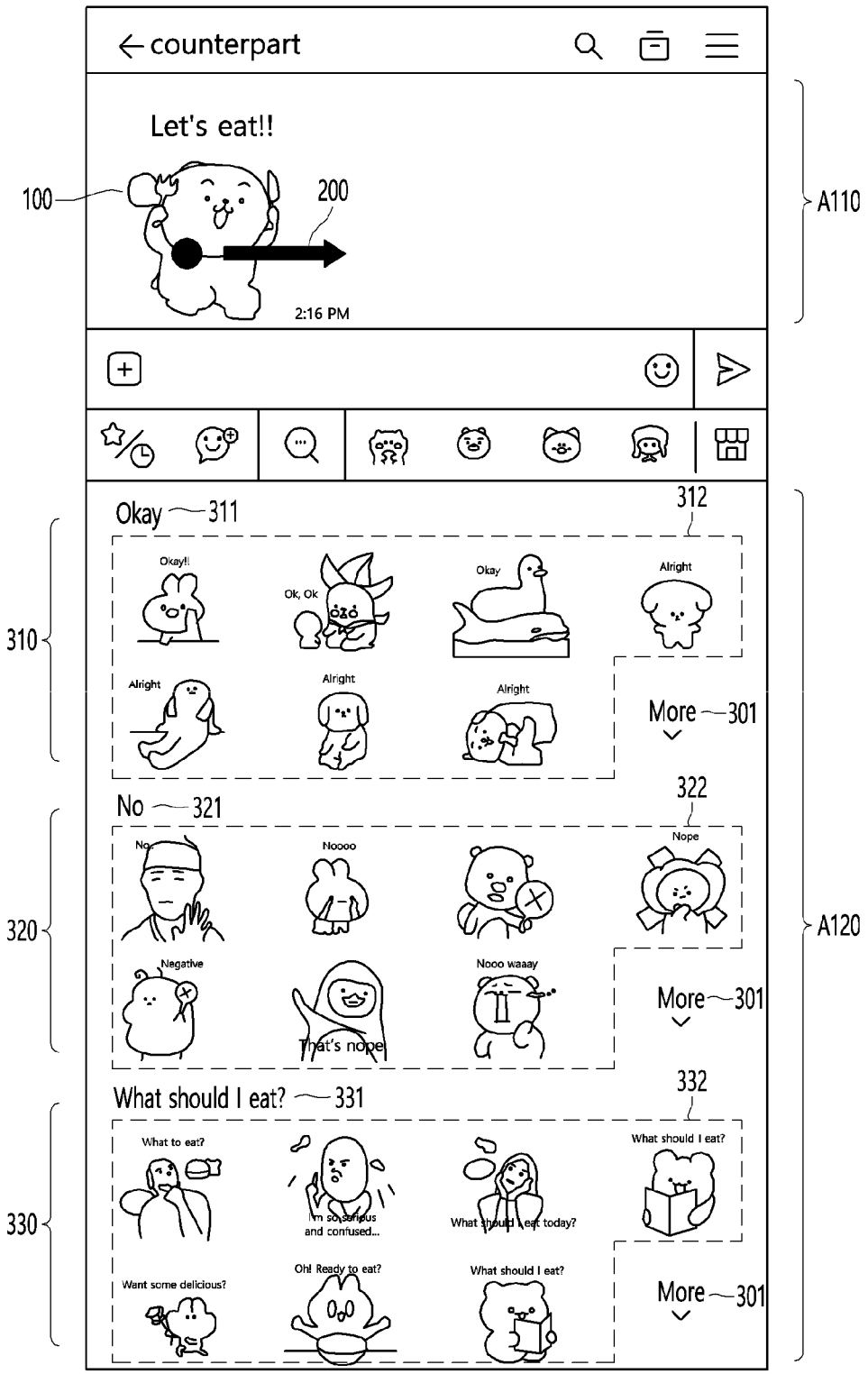
FIG. 5 is a diagram illustrating an exemplary screen on which a method for recommending emoticons is performed in a user terminal.

FIG. 5 is a diagram illustrating an exemplary screen on which a method for recommending emoticons is performed in the user terminal 10. The exemplary screen of FIG. 5 shows that emoticons are recommended based on the meta information correspondence table of FIG. 4.

A user terminal 10 may display a first emoticon 100 in a first area A110 of a screen of a chat room in operation S110. The first area A110 may be a portion in which a chat message is displayed.

Here, first meta information related to the first emoticon 100 may be meta information of the keyword field "Let's eat". In addition, as shown in FIG. 4, the first, second, and third associated meta information may be meta information of keyword fields such as "Yes", "No" and "What should I eat?".

The user terminal 10 receives a user's interaction with respect to the first emoticon 100 in operation S120. An interaction 200 may be, for example, swiping the first emoticon 100 in a left or right direction, but not limited thereto.

The user terminal 10 may display the plurality of recommended emoticons by categorizing the same into first, second, and third recommendation groups 310, 320, and 330 in operation S130. In operation S130, the recommended emoticons may be displayed in a second area A120 different from the first area A110 of the chat room screen. The second area A120 may be an area in which a keyboard interface for inputting a chat message is displayed, and may be changed to displaying the plurality of recommendation groups in operation S130.

The user terminal 10 may display at least one recommended emoticon belonging to each recommendation group, together with associated meta information (keyword) of each corresponding recommendation group. Here, recommended emoticons may be arranged in a predetermined arrangement method. In addition, in some cases, only some of the recommended emoticons may be displayed, and some of the others may be additionally displayed when an interaction with respect to a "More" interface 301 is input.

As shown in FIG. 5, the user terminal 10 may display the information "Yes" as associated meta information 311 of the first recommendation group 310, and display a recommended emoticon 312 having meta information "Yes" as metadata of the keyword field.

In addition, the user terminal 10 may displays information "No" as associated meta information 321 of the second recommendation group 320, and may display a recommended emoticon 322 having meta information "No" as meta information of the keyword field.

The user terminal 10 may display the information "What should I eat" as associated meta information 331 of the third recommendation group 330, and may display a recommended emoticon 332 having meta information "What should I eat" as meta information of the keyword field.

Hereinafter, a method for recommending emoticons by the user terminal 10 according to another embodiment of the present disclosure will be described with reference to FIGS. 6 to 7.

FIG. 6 is a table illustrating another example of first meta information and associated meta information corresponding to the first meta information.

Referring to FIG. 6 in comparison with FIG. 4, associated meta information may include a plurality of pieces of meta information in FIG. 6. It is preferable that the plurality of pieces of meta information included in one associated meta information is composed of pieces of information having similar contents or meaning. For example, meta information of the keyword field of "Yes" and "Ok" and meta information of the type field of "Positive" are bundled into one associated meta information.

A plurality of pieces of meta information included in one associated meta information may be meta information items corresponding to the same field or meta information items corresponding to different fields.

Referring to FIG. 6, when a first meta information item is "Let's eat" in the keyword field, it indicates that there are three associated meta information items. Specifically, a first associated meta information item may include meta information item of the keyword field of "Yes" and "Ok" and meta information item of the type field of "Positive". In addition, a second associated meta information item may include meta information item of the keyword field "No" and "Busy", meta information item of the type field "Negative", and meta information item of the emotion field "Perplexed". In addition, a third associated meta information item may include meta information items of the keyword field such as "What should I eat?", "Tonkatsu", and "Chinese food".

If so, the recommended emoticons included in the recommendation groups displayed in operation S130 may be a combination of recommended emoticons related to a plurality of pieces of meta information items included in one associated meta information item. For example, in the example shown in FIG. 6, a first recommendation group including recommended emoticons related to the first associated meta information may include four recommended emoticons related to the meta information item "Yes", two recommended emoticons related to the meta information item "OK", and one recommended emoticon related to the meta information item of "Positive".

Figure 7:
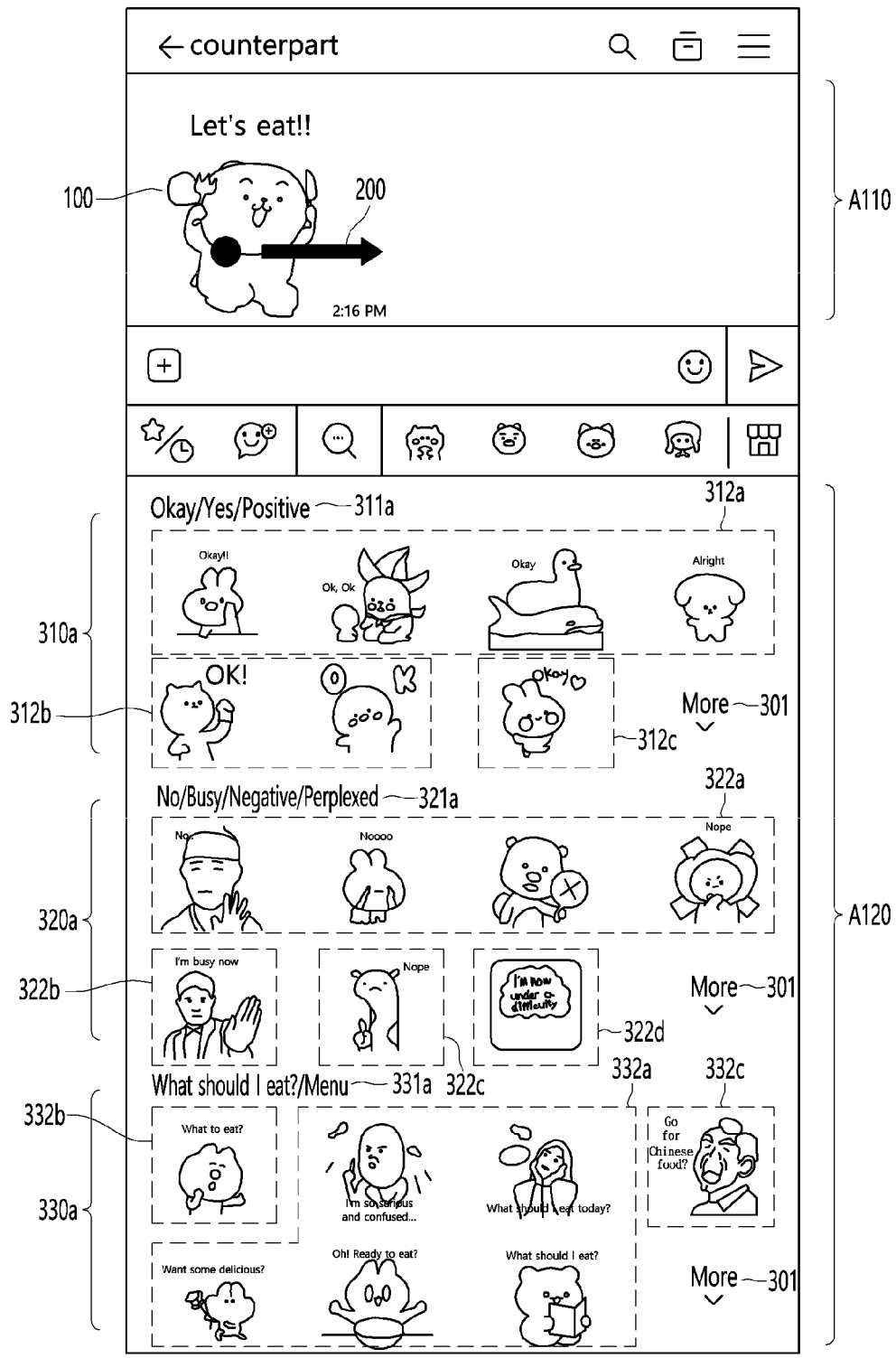
FIG. 7 illustrates another exemplary screen on which a method for recommending emoticons is performed in a user terminal.

FIG. 7 illustrates another exemplary screen in which a method for recommending emoticons is performed in the user terminal 10. The exemplary screen of FIG. 7 illustrates how to recommend emoticons based on a meta information correspondence table of FIG. 6.

In describing the exemplary screen of FIG. 7, differences will be mainly described in comparison with FIG. 5.

Unlike the example of FIG. 5, first, second, and third associated meta information items includes a plurality of pieces of meta information in FIG. 7.

In operation S130, the user terminal 10 may display a plurality of pieces of meta information included in the associated meta information of each recommendation group and also display at least one recommended emoticon belonging to each recommendation group.

As shown in FIG. 7, the user terminal 10 may list three meta information items "Yes/ok/positive" as associated meta information 311a of the first recommendation group 310a.

In addition, recommended emoticons related to the three meta information items may be displayed therebelow. Specifically, four emoticons 312a are recommended emoticons having meta information "Yes" as meta information of the keyword field. Then, the other two emoticons 312b are recommended emoticons having meta information "Ok" as meta information of the keyword field. Then, another emoticon 312c is a recommended emoticon having meta information "Positive" as meta information of the type field.

As shown in FIG. 7, the user terminal 10 may display the second recommendation group 320a in the same manner as the first recommendation group. First, the user terminal 10 may list and display four items of meta information "No/Busy/Negative/Difficult" as the associated meta information 321a of the second recommendation group.

The four emoticons 322a therebelow are recommended emoticons having meta information "No" as meta information of the keyword field. Then, another emoticon 322b is a recommended emoticon having meta information "Busy" as meta information of the keyword field. Then, another emoticon 322c is a recommended emoticon having meta information "Negative" as meta information of the type field. Then, another emoticon 322d is a recommended emoticon having meta information "Perplexed" as meta information of the emotion field.

As shown in FIG. 7, the user terminal 10 may display "What should I eat?/Menu" as associated meta information 331a of the third recommendation group 330a, without listing and displaying "What should I eat?", "Tonkasu", and "Chinese food" in order, which are meta information included in the third associated meta information, As such in displaying the associated meta information of the recommendation group, the user terminal 10 may display a broader concept of included meta information. In the case of the third recommendation group, "Menu" is displayed since "Menu" is the broader concept of the keywords "Tonkatsu" and "Chinese food".

Referring to FIG. 7, the user terminal 10 displays the recommended emoticons included in the third recommendation group, with the five emoticons 332a having the meta information "What should I eat?" as meta information of the keyword field. In addition, the two emoticons 332b and 332c displayed recommended emoticons having meta information of "Tonkatsu" and "Chinese food" as meta information of the keyword field, respectively.

The user terminal 10 may arrange a plurality of recommended emoticons in various ways while displaying recommended emoticons included in one recommendation group.

For example, the user terminal 10 may collect recommended emoticons having the same meta information in one place or arrange the same sequentially. Specifically, when the user terminal 10 displays the first recommendation group in FIG. 7, recommended emoticons 312a having meta information "Yes" are gathered and arranged in the first row, recommended emoticons 312b having meta information "Ok" are gathered and arranged in the second row, and a recommended emoticon 312c having meta information "Positive" is gathered and arranged in the second row. When the user terminal 10 displays the second recommendation group in the same manner in FIG. 7, it can be seen that recommended emoticons 322a, 322b, 322c, and 322d having the same meta information are gathered and arranged in one place.

However, in some cases, the user terminal 10 may arrange recommended emoticons having the same meta information in a manner different from gathering and arranging the recommended emoticons in one place. Specifically, when the user terminal 10 displays recommended emoticons of the third recommendation group in FIG. 7, it can be seen that recommended emoticons 332a having meta information "What should I eat" are arranged and distributed in the first row and the second row.

Here, as another method of arranging emoticons, for example, it may be possible to arrange the emoticons in consideration of the user's characteristic information and the user's emoticon use history. Here, considering the user's characteristic information may mean to display with the highest priority (or display at a front position) an emoticon preferred by users having the corresponding characteristic information based on the characteristic information such as the user's age and gender. The displaying of the third recommendation group in FIG. 7 will be described as an example. When the user of the user terminal 10 is a man in his twenties and the most preferred emoticon for men in their 20's among the recommended emoticons related to the third associated meta information is a Tonkatsu emoticon 332b, the Tonkatsu emoticon 332b may be displayed with the highest priority.

Similarly, considering the user's emoticon usage history may mean to display with the highest priority (or display at a front position) an emoticon frequently or recently used by the user. The displaying of the third recommendation group in FIG. 7 will be described as an example. When the user of the user terminal 10 has frequently used the Tonkatsu emoticon 332b recently, the Tonkatsu emoticon 332b may be displayed with the highest priority.

As another method, it may be possible to arrange emoticons in consideration of classification information of a chat room in which a recommendation group is displayed. The classification information of the chat room may include various types of information. For example, classification information may be given by classifying a chat room by casual level. A casual level of a chat room may be information on whether the environment of the chat room, chatting participants, and the context of conversation are appropriate to be casual and light or appropriate to be formal and strict. Specifically, when it is determined that the chat room is a business chat room based on information such as a title of the chat room, chat participants, conversation context, and emoticons used in the chat room, the casual level of the chat room is set to a low level. In this case, an emoticon having a low casual level may be displayed with the highest priority based on the casual level in meta information of emoticons.

For example, when the casual level of the chat room is low in displaying the second recommendation group in FIG. 7, a "I'm now under a difficulty" emoticon 322*d*, which is the most casual emoticon among the recommended emoticons in the second recommendation group, may be displayed with the highest priority.

Classification information of the chat room may be determined by various classification criterion in addition to the above-mentioned casual level. For example, it is possible to classify a chat room by a topic and display an emoticon suitable for that topic with the highest priority. In addition, it is possible to classify a chat room by a language used (Korean, English, Japanese, etc.), and display an emoticon suitable for the language with the highest priority.

Hereinafter, an embodiment of a method in which the user terminal 10 according to the present disclosure recommends emoticons will be described with reference to FIGS. 8 to 9.

Figure 8:
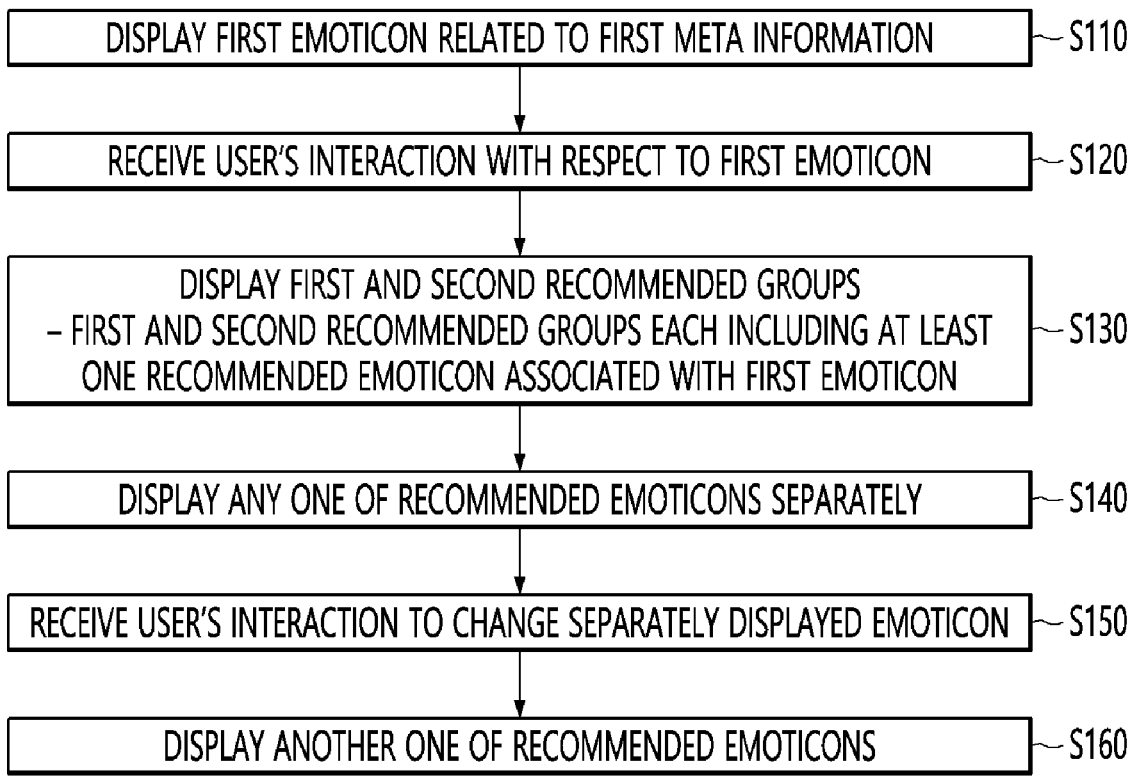
FIG. 8 is a flowchart of a method for recommending emoticons according to an embodiment.

FIG. 8 is a flowchart of a method for recommending emoticons according to an embodiment.

Operations S110, S120, and S130 are the same as described above, and thus, descriptions thereof will be herein omitted.

In operation S140, the user terminal 10 separately displays any one of recommended emoticons. Specifically, the user terminal 10 may display any one of the emoticons in a preview form through an output part. A preview may be displayed on a chat room screen of the user terminal 10, which is different from a second area.

The emoticon separately displayed in the operation S140 may be determined in various ways. For example, an emoticon selected by a user among the recommended emoticons displayed in the operation S130 may be separately displayed in operation S140. To this end, the user terminal 10 may receive the user's interaction. In addition, a first displayed emoticon among the recommended emoticons included in the first recommendation group displayed in the operation S130 may be separately displayed in the operation S140. In addition, any one of the recommended emoticons included in the first recommendation group displayed in the operation S130 may be separately displayed in the operation S140. Also, in some cases, any one of the recommended emoticons included in all the recommendation groups displayed in the operation S130 may be separately displayed in the operation S140.

In operation S150, the user terminal 10 may receive an interaction for changing a separately displayed emoticon from the user. Here, the interaction may be swiping the above-described second area in a predetermined direction, but not limited thereto.

In operation S160, the user terminal 10 may separately display another one of the recommended emoticons in response to the interaction received in the operation S150. In other words, it is to change the separately displayed emoticon to another emoticon.

The another emoticon to be changed in the operation S160 may be determined in various ways. For example, the another emoticon to be changed may be an emoticon included in a recommendation group different from that of the emoticon separately displayed in the operation S140. More specifically, as the interaction for changing the separately displayed emoticon is received, emoticons included in a plurality of recommendation groups may be sequentially and separately displayed. That is, if the emoticons included in the first recommendation group are separately displayed, the emoticons included in the second recommendation group may be separately displayed and then the emoticons included in the third recommendation group may be separately displayed.

In this way, the user may be able to input an interaction and select an emoticon included in a desired recommendation group.

Figure 9:
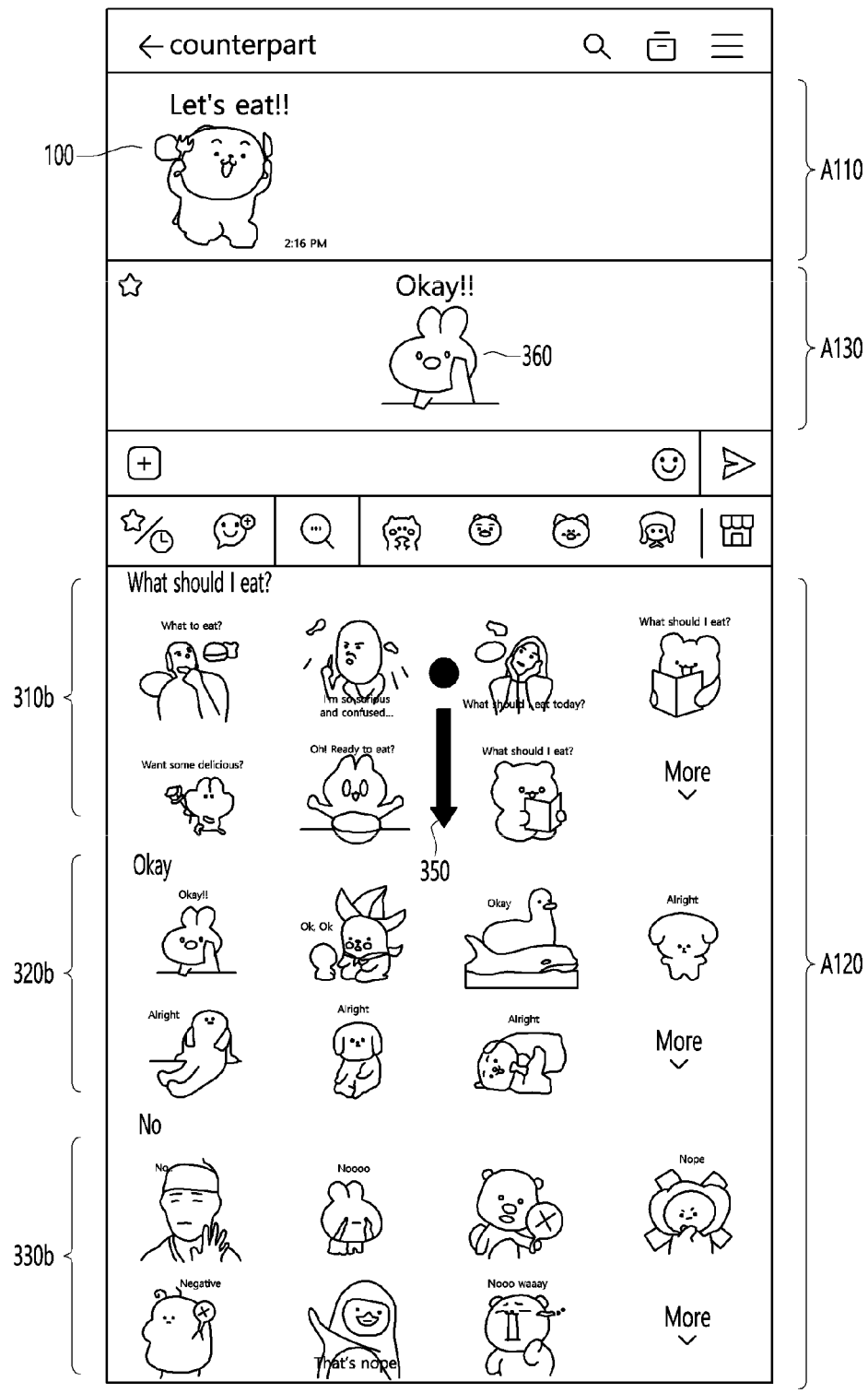
FIG. 9 illustrates an exemplary screen on which a method for recommending emoticons is performed in a user terminal.

FIG. 9 illustrates an exemplary screen on which a method for recommending emoticons is performed in the user terminal 10.

The user terminal 10 separately displays any one of the recommended emoticons in the operation S140. The user terminal 10 may allocate a separate area A130 at an upper end of the second area A120 to display any one emoticon in a preview form 360.

The user terminal 10 may receive a predetermined interaction 350 from the user in the operation S150. The predetermined interaction may be related to changing the separately displayed emoticon. The predetermined interaction may be, for example, swiping the second area A120 downward.

The user terminal 10 may change the separately displayed emoticon in response to the interaction received in the operation S160. As shown in FIG. 9, if an emoticon included in the second recommendation group 320*b* is now being separately displayed, the separately displayed emoticon may be changed to an emoticon included in the third recommendation group 330*b* in response to the interaction. Then, when another interaction is input again, the newly separately displayed emoticon may be changed to an emoticon included in the first recommendation group 310*b* in response to the another interaction.

Hereinafter, a method in which the user terminal 10 arranges recommendation groups will be described by comparing FIGS. 5 and 9.

In displaying the plurality of recommendation groups in operation S130, The user terminal 10 may arrange the plurality of recommendation groups in various ways. First, the user terminal 10 may arrange a plurality of recommendation groups according to a predetermined order in the operation S130. However, in some cases, it is also possible for the user terminal 10 to change the arrangement order of the plurality of recommendation groups in consideration of other factors in the operation S130. When FIGS. 5 and 9 are compared, it can be seen that the recommendation groups are displayed in response to the same first meta information but arranged in different orders.

Specifically, the user terminal 10 may arrange the recommendation groups in consideration of the user's emoticon usage history, and the like. For example, if there is a history that the user has frequently sent emoticons with the keyword "Yes" in response to an emoticon with the keyword "Let's eat", a recommendation group 310 including emoticons related to the keyword "Yes" may be displayed at the top as shown in FIG. 5. On the other hand, if there is a history that the user has frequently sent emoticons with the keyword "What should I eat?" in response to an emoticon with the keyword "Let's eat", a recommendation group 310b including emoticons related to the keyword "What should I eat?" may be displayed at the top, as shown in FIG. 9.

In some cases, the user terminal 10 may arrange recommendation groups in consideration of history or classification information of a chat room. For example, if there is a history that the user has frequently sent emoticons with the keyword "Yes" in a specific chat room in response to an emoticon with the keyword "Let's eat", the recommendation group 310 including emoticons related to the keyword "Yes" may be displayed at the top as shown in FIG. 5. On the other hand, if there is a history that the user has frequently sent emoticons with the keyword "What should I eat?" in a different chat room in response to an emoticon with the keyword "Let's eat", the recommendation group 310b including emoticons related to the keyword "What should I eat?" may be displayed at the top, as shown in FIG. 9.

In this manner, even if the first emoticon 100 and the first meta information are the same, the order of the recommendation groups displayed for each user and each chat room may be different.

Hereinafter, information flow between the user terminal 10 and the server 20 in a method for recommending emoticons will be described with reference to FIGS. 10 to 13. In describing the present embodiment, the description already provided with reference to FIGS. 3 to 5 will be herein omitted for convenience of description.

First, an embodiment of a method in which the user terminal 10 according to the present disclosure recommends emoticons will be described with reference to FIG. 10. In this embodiment, a flow of information between the user terminal 10 and the server 20 in the method for recommending emoticons will be mainly described.

Figure 10:
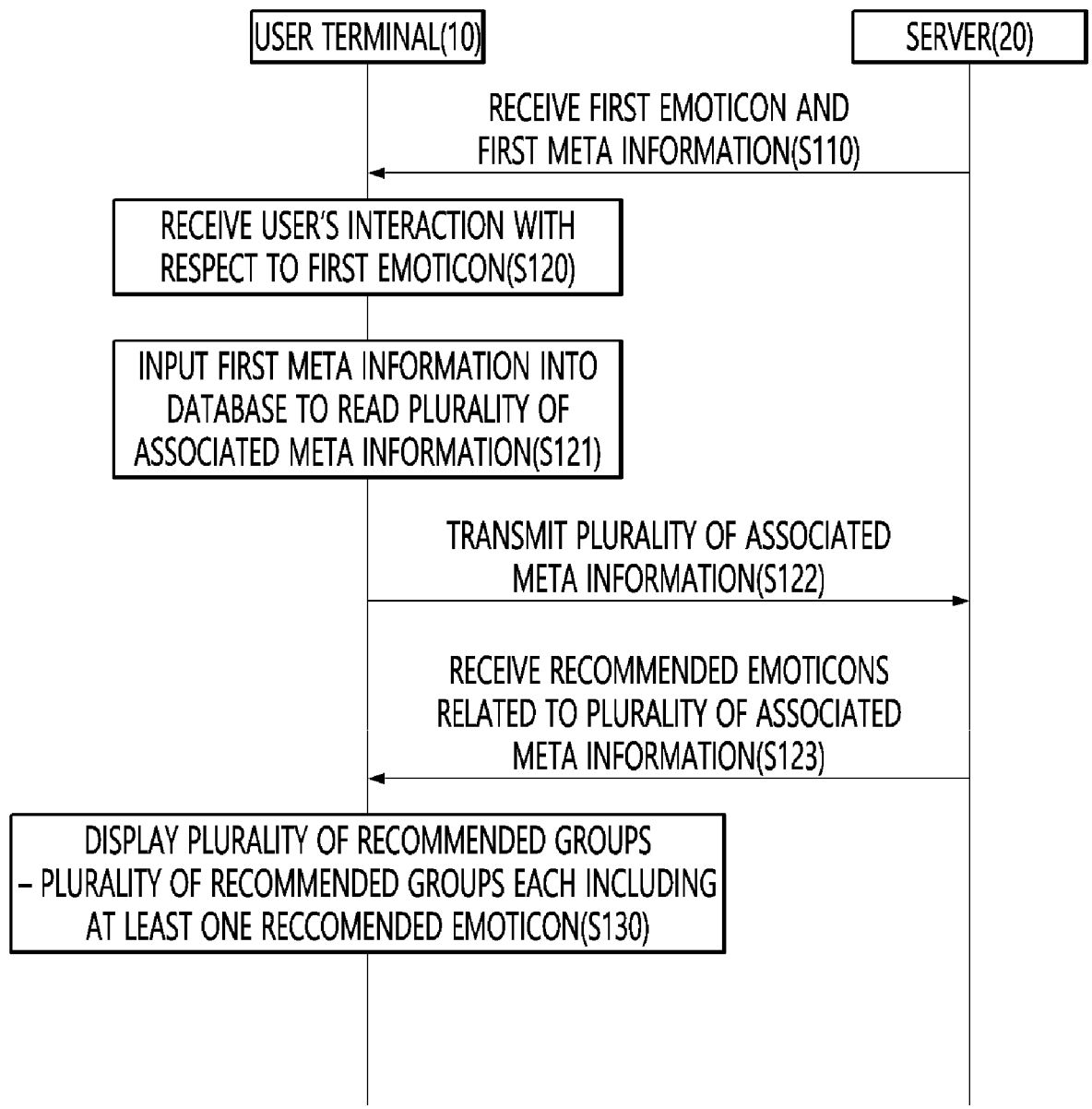
FIGS. 10 to 13 are diagrams showing information flow between a user terminal and a server in a method for recommending emoticons.

FIG. 10 illustrates a flow of information between the user terminal 10 and the server 20 in the method for recommending emoticons.

In operation S110, the user terminal 10 receives a first emoticon 100 and first meta information from the server 20. The user terminal 10 may estimate the meaning of a counterpart's using the first emoticon based on the first meta information. Then, based on the estimated meaning, the user terminal 10 may recommend an emoticon suitable to be used as a response to the first emoticon.

In operation S120, the user terminal 10 receives an interaction for the first emoticon from the user.

In operation S121, the user terminal 10 inputs the first meta information into a database and reads a plurality of pieces of associated meta information corresponding to the first meta information. To this end, the user terminal 10 has to directly store in a memory 14 a database in which the first meta information and the plurality of pieces of associated meta information corresponding to the first meta information are stored, or the user terminal 10 must be able to access such a database.

When the user terminal 10 directly stores such a database in the memory 14, the database may be stored in an application related to the method for recommending emoticons according to the present disclosure. This database may be updated when the user terminal 10 receives information through the server 20. If the user terminal 10 directly stores this database in the memory 14, there is an advantage of performing a process faster compared to a case where the user terminal 10 accesses a database through the external server 20.

When the user terminal 10 reads the plurality of pieces of associated meta information in the operation S121, the user terminal 10 needs information on recommended emoticons related to the plurality of pieces of associated meta information. If the user terminal 10 stores information on the recommended emoticons in its own memory, the recommended emoticons may be read from the memory; otherwise, the user terminal 10 need to receive the recommended emoticons from the server 20.

To this end, in operation S122, the user terminal 10 transmits the plurality of pieces of associated meta information to the server 20. Then, in operation S123, the user terminal 10 receives the recommended emoticons related to the plurality of pieces of associated meta information from the server 20.

Thereafter, in operation S130, the user terminal 10 divides the recommended emoticons into a plurality of recommendation groups and displays the plurality of recommendation groups. In addition, each of the plurality of recommendation groups includes at least one recommended emoticon related to associated meta information.

Figure 11:
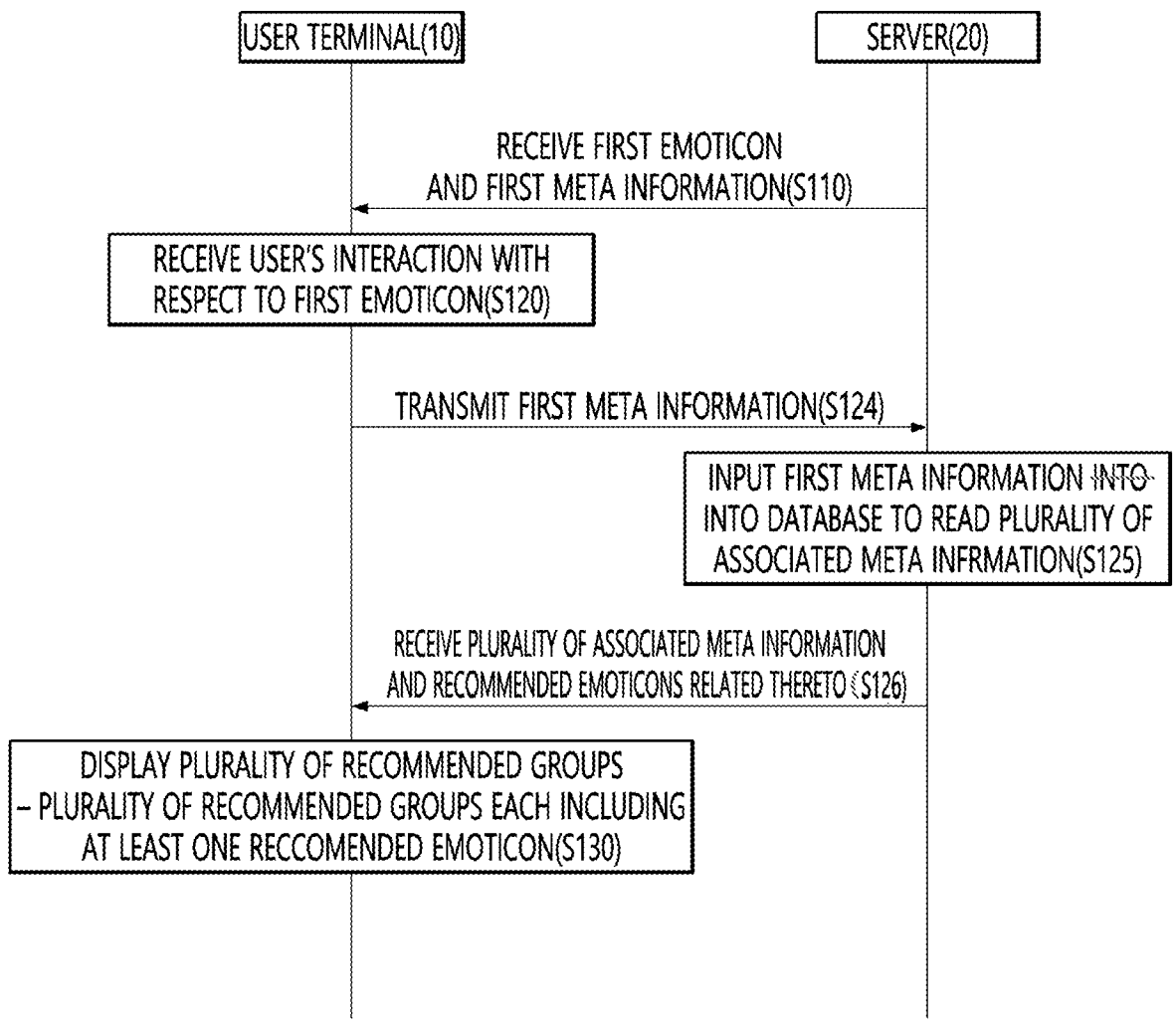

Hereinafter, an embodiment of a method in which the user terminal 10 according to the present disclosure recommends emoticons will be described with reference to FIG. 11. In the present embodiment, in the method for recommending emoticons, a flow of information between the user terminal 10 and the server 20 will be mainly described, and differences from the description already provided with reference to FIG. 10 will be mainly described.

The embodiment to be described with reference to FIG. 11 relates to a case in which the user terminal 10 does not directly store in the memory a database in which first meta information and a plurality of pieces of associated meta information corresponding to the first meta information are stored. In this case, the database is stored in the server 20, so that the user terminal 10 can send a request to the server 20 to receive the plurality of pieces of associated meta information.

First, in operation S124, the user terminal 10 transmits the first meta information to the server 20. In response, in operation S125, the server 20 inputs the first meta information into the database to read the plurality of pieces of associated meta information. In operation S126, the user terminal 10 receives the plurality of pieces of associated meta information and a recommended emoticon related thereto. Thereafter, in operation S130, the user terminal 10 divides the recommended emoticons into a plurality of recommendation groups and displays the plurality of recommendation groups.

Hereinafter, an embodiment of a method in which the user terminal 10 of the present disclosure recommends an emoticon will be described with reference to FIGS. 12 and 13. In the present embodiment, when it comes to a flow of information between the user terminal 10 and the server 20 in the method for recommending emoticons, differences from the description already provided with reference to FIGS. 10 and 11 will be mainly described.

In the embodiments described with reference to FIGS. 12 and 13, the user terminal 10 receives only the first emoticon 100 in operation S110 without the first meta information.

First, the embodiment of FIG. 12 will be described. In the embodiment of FIG. 12, the user terminal 10 may input information on the first emoticon 100 to read a plurality of pieces of associated meta information in operation S121. This is different from that in the embodiment of FIG. 10 in which the user terminal 10 inputs the first meta information into the database to read the plurality of pieces of associated meta information in the operation S121.

Figure 12:
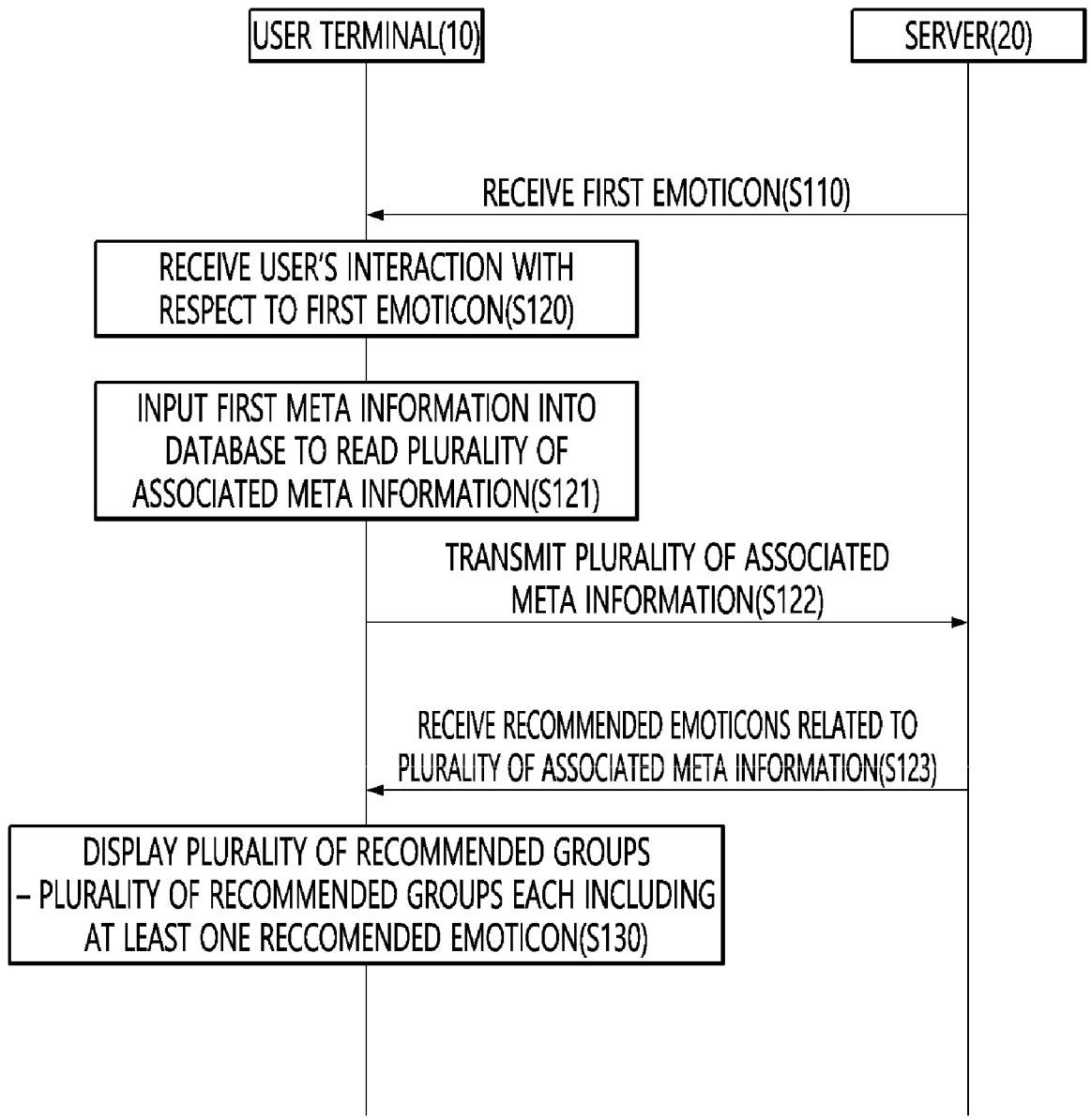

Specifically, in the embodiment of FIG. 12, the user terminal 10 may directly store or access the database related to the meta information related to the first emoticon 100. Accordingly, the user terminal 10 may first read the first meta information using only identification information (ID, serial number, etc.) of the first emoticon 100 and then input the read first meta information into the database to read a plurality of pieces of associated meta information.

Subsequent operations S122, S123, and S130 are the same as those described above with reference to FIG. 10, and thus descriptions will be omitted.

Hereinafter, the embodiment described with reference to FIG. 13 will be described. In the embodiment of FIG. 13, the user terminal 10 transmits information on the first emoticon 100 to the server 20 in operation S124. This is different from that in the embodiment of FIG. 11, the user terminal 10 transmits the first meta information to the server 20 in operation S124.

Figure 13:
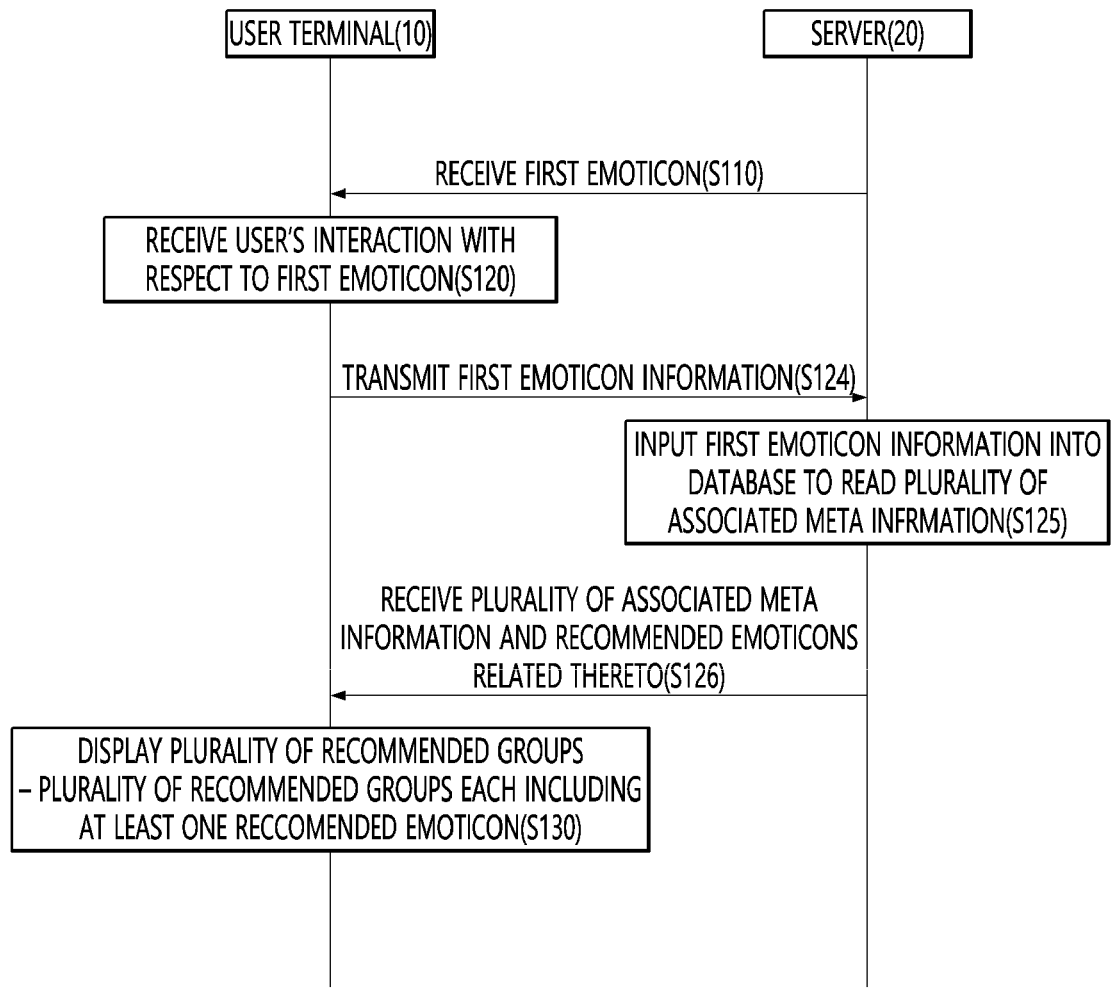

Specifically, in the embodiment of FIG. 13, the server 20 may directly store a database related to meta information related to the first emoticon 100 or may be able to access such a database. Accordingly, the server 20 may input the first emoticon 100 into the database to read the plurality of pieces of associated meta information in operation S125. Specifically, the server 20 first reads the first meta information using only the identification information (ID, serial number, etc.) of the first emoticon 100, and then inputs the read first meta information into the database to read the plurality of pieces of associated meta information.

Subsequent operations S126 and S130 are the same as those described above with reference to FIG. 10, and thus, a description thereof will be omitted.

Figure 14:
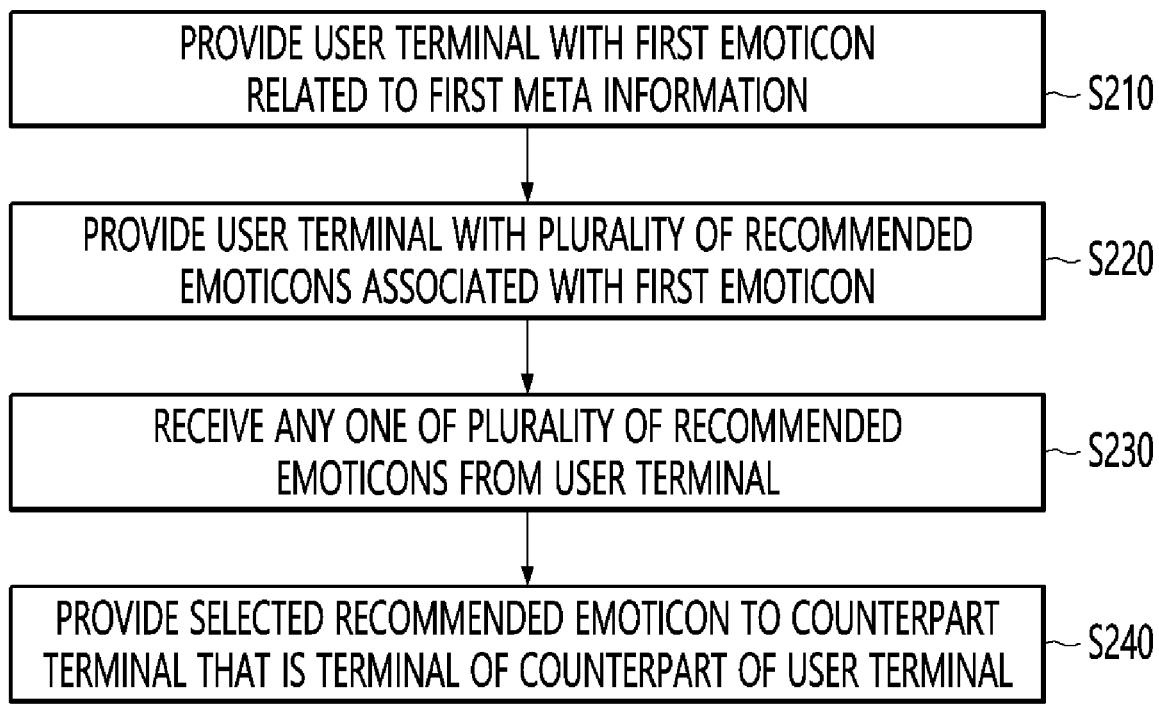
FIG. 14 is a flowchart of a method for recommending emoticons according to an embodiment.

Hereinafter, a method for recommending emoticons by the server 20 of the present disclosure will be described with reference to FIG. 14.

The server 20 described with reference to FIG. 14 operates in connection with the user terminal 10 described above via a network. Accordingly, a description redundant with the above description on the method for recommending emoticons by the server 20 will be herein omitted.

First, in operation S210, the server 20 provides a first emoticon related to the first meta information to the user terminal 10. After operation S210, the server 20 may receive interaction input information requesting to provide a recommended emoticon from the user terminal 10.

Then, in operation S220, the server 20 provides a plurality of recommended emoticons associated with the first emoticon to the user terminal 10. Here, the plurality of recommended emoticons is included in any one of first and second recommendation groups.

Then, in operation S230, the server 20 receives information on selection of any one of the plurality of recommended emoticons from the user terminal 10.

In operation S240, the server 20 provides a selected recommended emoticon to the counterpart terminal 30, which refers to a chatting counterpart of the user terminal 10.

The present disclosure may be a computer program stored in a medium to execute the above-described methods in combination with hardware.

In addition, the present disclosure includes: a memory; a processor connected to the memory and configured to execute instructions stored in the memory, wherein the processor provides a first emoticon related to first meta information to a user terminal; and a server configured to provide a plurality of recommended emoticons corresponding to the first emoticon to the user terminal, wherein the plurality of recommended emoticons are included in any one of first and second recommendation group, receive information on any one emoticon selected from among the plurality of recommended emoticons from the user terminal, provide the selected recommended emoticon to a counterpart terminal that is a chat counterpart of the user terminal, wherein at least one recommended emoticon included in the first recommendation group is related to at least one piece of first associated meta information corresponding to the first meta information, wherein at least one recommended emoticon included in the second recommendation group is related to at least one second associated meta information that corresponds to the first meta information and is different from the first associated meta information, and provide a recommendation of an emoticon related to at least one second associated meta information different from the first associated meta information.

Technical features disclosed in each embodiment of the present disclosure are not limited only to a corresponding embodiment, and all the technical features disclosed in embodiments may be combined and applied to different embodiments unless the technical features are incompatible with each other.

Thus, although each embodiment has been described mainly about technical features thereof, but all the technical features may be combined and applied unless the technical features are incompatible with each other.

Although exemplary embodiments of the present disclosure have been described above, it may be understood by those skilled in the art that various changes or modifications may be made thereto without departing from the essential features of the present disclosure. The scope of the present disclosure should be construed by the following claims, and all the technical scope belonging to the equivalents of the present disclosure should be interpreted to belong to the scope of the present disclosure.

What is claimed is:

1. A method for recommending emoticons, the method comprising:
    displaying, by a user terminal, a first emoticon related to first meta information; and
    displaying, by the user terminal, first and second recommendation groups, the first and second recommendation groups each comprising at least one recommended emoticon corresponding to the first emoticon,
    wherein at least one recommended emoticon included in the first recommendation group is related to at least one piece of first associated meta information corresponding to the first meta information,
    wherein at least one recommended emoticon included in the second recommendation group is related to at least one piece of second associated meta information that corresponds to the first meta information and is different from the first associated meta information, and
    wherein the first meta information and the first and second associated meta information are different.

2. The method of claim 1, further comprising:
    receiving, at the user terminal, a user's interaction with respect to the first emoticon,
    wherein the displaying of the first and second recommendation groups is performed in response to the interaction.

3. The method of claim 1, prior to the displaying of the first and second recommendation groups, further comprising:

reading, by the user terminal, the first and second associated meta information that correspond to the first meta information.

4. The method of claim 3, wherein:
the user terminal comprises a database in which meta information of a received emoticon and a plurality of pieces of associated meta information corresponding to the meta information are stored, and
in the reading, the user terminal inputs the first meta information into the database to read the first and second associated meta information.

5. The method of claim 1, further comprising:
transmitting, by the user terminal, the first and second associated meta information to a server; and
receiving, by the user terminal, a plurality of recommended emoticons related to the first and second associated meta information from the server,
wherein the displaying of the first and second recommendation groups comprises classifying and displaying the plurality of recommended emoticons, which are received in the receiving, into the first and second recommendation groups.

6. The method of claim 1, prior to the displaying of the first and second recommendation groups, further comprising:
transmitting, by the user terminal, the first meta information to a server; and
receiving the first and second associated meta information from the server.

7. The method of claim 1, prior to the displaying of the first and second recommendation groups, further comprising:
transmitting, by the user terminal, information on the first emoticon to a server; and
receiving, by the user terminal, the recommended emoticon from the server.

8. The method of claim 1, wherein:
meta information related to each of the first emoticon and the recommended emoticon comprises a plurality of pieces of meta information classified into a plurality of fields, and
the first meta information and the first associated meta information are meta information corresponding to a same field.

9. The method of claim 1, wherein:
the meta information related each of the recommended emoticons comprises a plurality of pieces of meta information divided into a plurality of fields, and
the first and second associated meta information is meta information corresponding to a same field.

10. The method of claim 1, wherein the first associated meta information comprises a plurality of pieces of different meta information.

11. The method of claim 1, wherein the first meta information and the first and second associated meta information are keywords used to search for a related emoticon.

12. The method of claim 1, wherein at least one recommended emoticon included in the first recommendation group is arranged and displayed according to a predetermined criterion.

13. The method of claim 12, wherein the predetermined method is a method of sorting according to at least one of the user's characteristic information, the user's emoticon usage history, and classification information of a chat room in which the first and second recommendation groups are displayed.

14. The method of claim 1, wherein:
in the displaying the first emoticon, the first emoticon is displayed in a first area of a screen of a chat room, and
in the displaying of the first and second recommendation groups, the first and second recommendation groups are displayed in a second area different from the first area of the screen.

15. The method of claim 14, wherein:
the first area is an area in which a dialog between the user and a chat counterpart of the user is displayed, and
the second area is an area in which a keyboard interface for inputting a chat message is displayed whereas the first and second recommendation groups are displayed in the displaying the first and second recommendation groups.

16. A user terminal providing emoticon recommendations, the user terminal comprising:
a memory;
a processor connected to the memory and configured to execute instructions stored in the memory;
an input part configured to receive information under control of the processor;
an output part configured to output information under control of the processor; and
a communication part configured to transmit information to an outside under control of the processor,
wherein the processor is further configured to:
display a first emoticon related to the first meta information through the output part; and
display first and second recommendation groups through the output part, the first and second recommendation groups each comprising at least one recommended emoticon corresponding to the first emoticon,
wherein at least one recommended emoticon included in the first recommendation group is related to at least one piece of first associated meta information corresponding to the first meta information,
wherein at least one recommended emoticon included in the second recommendation group is related to at least one piece of second associated meta information that corresponds to the first meta information and is different from the first associated meta information, and
wherein the first meta information and the first and second associated meta information are different.

17. A method for recommending emoticons, the method comprising:
providing, by a server, a first emoticon related to first meta information to a user terminal;
providing, by the server, a plurality of recommended emoticons corresponding to the first emoticon to the user terminal, the plurality of recommended emoticons being included in any one of first and second recommendation groups; and
receiving, by the server, information on any one emoticon selected from among the plurality of recommended emoticons from the user terminal; and
providing, by the server, the selected recommended emoticon to a counterpart terminal that is a chat counterpart of the user terminal,
wherein at least one recommended emoticon included in the first recommendation group is related to at least one piece of first associated meta information corresponding to the first meta information,
wherein at least one recommended emoticon included in the second recommendation group is related to at least one piece of second associated meta information that corresponds to the first meta information and is different from the first associated meta information, and wherein the first meta information and the first and second associated meta information are different.

18. The method of claim 17, prior to the providing the plurality of recommended emoticons, further comprising:

receiving, by the server, the first and second associated meta information from the user terminal; and selecting, by the server, the plurality of recommended emoticons related to the first and second associated meta information.

19. The method of claim 17, prior to the providing the plurality of recommended emoticons, further comprising:

reading, by the server, the first and second associated meta information corresponding to the first meta information; and selecting, by the server, the plurality of recommended emoticons related to the first and second associated meta information.

* * * * *